United States Patent
Sundararajan et al.

(10) Patent No.: US 11,098,724 B2
(45) Date of Patent: Aug. 24, 2021

(54) CONTROL SYSTEM AND METHOD FOR DETERMINING CONTAMINANT LOADING OF TURBINE BLADES

(71) Applicant: General Electric Company, Schenectady, NY (US)

(72) Inventors: Guruprasad Sundararajan, Bangalore (IN); Prashanth Pillai, Bangalore (IN); Muralikrishan R., Bangalore (IN); Rebecca Hefner, Greenville, SC (US); Bradford Foulkes, Greenville, SC (US); Anbarasan Viswanathan, Bangalore (IN); Robert G. Kelly, Charlottesville, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 913 days.

(21) Appl. No.: 15/603,082

(22) Filed: May 23, 2017

(65) Prior Publication Data
US 2018/0340542 A1 Nov. 29, 2018

(51) Int. Cl.
*F04D 27/00* (2006.01)
*G01N 17/04* (2006.01)
(Continued)

(52) U.S. Cl.
CPC ........... *F04D 27/001* (2013.01); *G01M 15/14* (2013.01); *G01N 17/04* (2013.01); *G05B 13/048* (2013.01);
(Continued)

(58) Field of Classification Search
CPC ....................... F05D 2260/81; F05D 2260/821
See application file for complete search history.

(56) References Cited

U.S. PATENT DOCUMENTS 8,116,990 B2   2/2012 Koul
8,224,595 B2   7/2012 Hefner et al.
(Continued)

FOREIGN PATENT DOCUMENTS

JP   2000274206 A   10/2000
JP   5049852 B2   10/2012
WO   WO-2016200467 A1 *   12/2016   ........... G07C 5/0808

OTHER PUBLICATIONS

Kurz et al. ("Fouling Mechanisms in Axial Compressors", Journal of Engineering for Gas Turbines and Power, Jan. 2011) (Year: 2011).*

(Continued)

*Primary Examiner* — Jennifer Bahls
(74) *Attorney, Agent, or Firm* — The Small Patent Law Group LLC; Josef L. Hoffmann

(57) ABSTRACT

A control system and method utilizing one or more processors that are configured to determine contaminant loading of blades of a turbomachinery compressor based on one or more environmental conditions to which the turbomachinery compressor is exposed and one or more atmospheric air inlet conditions of the turbomachinery compressor. The one or more processors then determine a corrosion contaminant concentration on the blades of the turbomachinery compressor based on the contaminant loading that is determined and determine an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

22 Claims, 9 Drawing Sheets

(51) Int. Cl.
  *G05B 13/04* (2006.01)
  *G01M 15/14* (2006.01)
(52) U.S. Cl.
  CPC ...... *F05D 2220/32* (2013.01); *F05D 2230/80* (2013.01); *F05D 2240/20* (2013.01); *F05D 2260/80* (2013.01); *F05D 2260/81* (2013.01); *F05D 2260/821* (2013.01); *F05D 2270/306* (2013.01); *F05D 2270/311* (2013.01); *F05D 2270/313* (2013.01)

(56) References Cited

U.S. PATENT DOCUMENTS

| | | | |
|---|---|---|---|
| 8,378,676 | B2 | 2/2013 | Ceschini et al. |
| 8,475,110 | B2 | 7/2013 | Hefner et al. |
| 8,540,936 | B2 | 9/2013 | Hefner et al. |
| 8,543,317 | B2 | 9/2013 | Pasero et al. |
| 8,589,087 | B2 | 11/2013 | Martin et al. |
| 8,834,649 | B2 | 9/2014 | Gebhardt et al. |
| 9,033,649 | B2 | 5/2015 | Kato et al. |
| 2011/0027063 | A1* | 2/2011 | Hefner ............... G01N 17/02 415/1 |
| 2014/0174474 | A1* | 6/2014 | Ekanayake .......... G01N 17/008 134/18 |
| 2015/0276548 | A1 | 10/2015 | Holcomb et al. |
| 2017/0286572 | A1* | 10/2017 | Hershey ............. G05B 23/0283 |

OTHER PUBLICATIONS

Borello et al. ("Modelling of Particle Transport, Erosion and Deposition in Power Plant Gas Paths", Proceedings of ASME Turbo Expo 2016: Power for Land, Sea, and Air, Jun. 13/17, 2016) (Year: 2016).*

Ahmed et al.; "Fracture Mechanics Based Fatigue Life Estimation of Axial Compressor Blade", 2016 13th International Bhurban Conference on Applied Sciences and Technology (IBCAST), pp. 69-74, Jan. 12-16, 2016, Islamabad (6 pages).

Chan et al.; "Development of a Probabilistic Methodology for Predicting Hot Corrosion Fatigue Crack Growth Life of Gas Turbine Engine Disks", ASME Turbo Expo 2013: Turbine Technical Conference and Exposition, vol. 7A, Jun. 3-7, 2013, San Antonio (8 Pages.

Van Den Steen, et al.; "An Integrated Modeling Approach for Atmospheric Corrosion in Presence of a Varying Electrolyte Film", ElectrochimicaActa, Journal, 187, pp. 714-723, 2016 (10 pages).

Woldemedhin, et al.; "Evaluation of the Maximum Pit Size Model on Stainless Steels Under Thin Film Electrolyte Conditions" Journal of the Electrochemical Society, 161 (8) E3216-E3224 (2014) (9 pages).

Extended European Search Report and Opinion issued in connection with corresponding EP Application No. 18171482.5 dated Nov. 7, 2018.

* cited by examiner

CONTROL SYSTEM AND METHOD FOR DETERMINING CONTAMINANT LOADING OF TURBINE BLADES

FIELD

The subject matter described herein relates to monitoring a turbomachinery compressor, and to a control system for determining corrosion characteristics.

BACKGROUND

Turbomachinery compressors are utilized on commercial aircraft and land based gas turbines and are susceptible to significant corrosion and degradation throughout the lifetime of the compressor. In particular, compressors are subject to varying environmental conditions, including humidity, temperature gradients, exposure to moisture and significant salt and dust content and the like. While during flights and operation the ingestion of salts and dust creates a deposit on the surface of the blades and vanes. Heat generated during the course of operation prevents condensation, whereas during downtime as the blades of the turbocharger compressor cool down to ambient temperature, condensation phenomenon occurs. The longer the downtime, the higher the probability that condensation will occur, thereby resulting in a thin film of water, dust and salt accumulated during operation. This salt water film creates an ideal environment for aqueous pitting corrosion to occur.

Such environmental conditions over long periods of time cause fatigue to the components within the compressor including the compressor blades. Eventually, as the compressor is continually exposed to these highly corrosive conditions, pitting begins to occur. Pits are very small holes that are created at the surface of a component. As pitting increases over a component as a result of corrosion, the fatigue capability of the components reduces thereby increasing the probability of cracking and turbomachinery reliability and availability.

Consequently, such pitting results in blade and vane cracking leading to significant downtime in repairs and replacement and additionally, unplanned outage costs. Thus, a need in the art exists for predicting the effects of high cycle fatigue such that costs related to such fatigue can be minimized. Current modeling techniques have proven insufficient in accurately predicting fatigue based failures under corrosive environments.

BRIEF DESCRIPTION

In one embodiment, a method is provided that includes determining, using one or more processors, contaminant loading of blades of a turbomachinery compressor based on one or more environmental conditions to which the turbomachinery compressor is exposed and one or more atmospheric air inlet conditions of the turbomachinery compressor. This method also includes determining, using the one or more processors, a corrosion contaminant concentration on the blades of the turbomachinery compressor based on the contaminant loading that is determined. The method also includes the step of determining, using the one or more processors, one or more of an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

In one embodiment, a control system is provided that has one or more processors configured to determine contaminant loading of blades of a turbomachinery compressor based on one or more environmental conditions to which the turbomachinery compressor is exposed and one or more atmospheric air inlet conditions of the turbomachinery compressor. The one or more processors are also configured to determine a corrosion contaminant concentration on the blades of the turbomachinery compressor based on the contaminant loading that is determined. The one or more processors are also configured to determine one or more of an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

In one embodiment, a control system is provided that has one or more processors configured to determine contaminant loading of blades of a turbomachinery compressor based on one or more environmental conditions to which the turbomachinery compressor is exposed and one or more atmospheric air inlet conditions of the turbomachinery compressor. The one or more processors are also configured to determine a corrosion contaminant concentration on the blades of the turbomachinery compressor based on the contaminant loading that is determined. The one or more processors are also configured to create or update a digital twin of the turbomachinery compressor, where the one or more processors are also configured to monitor the digital twin of the turbomachinery compressor to determine when to repair one or more of the blades of the turbomachinery compressor.

DETAILED DESCRIPTION

A control system and the method are provided for predicting aqueous corrosion damage based on environmental, operational, and machine outage information for turbomachinery components. The system and method can process data obtained from sensors for temperature, relative humidity, and salt concentration in air in proximity (e.g., close proximity, such as within a few centimeters to few meters) to the component of interest (e.g., turbomachinery blades). The data can be processed using mathematical models that predict the extent of corrosion damage. The extent of corrosion damage can be corrosion pit densities, pit depths, and/or fatigue debit of the component. The control system and method also can simulate a digital twin of the component undergoing degradation due to aqueous corrosion. Recommendations to a machine operator to make service/repair decisions can be determined based off the digital twin of the component.

A digital twin includes a computer-generated model or representation of a component or device. In the context of the control system and method for a turbomachinery compressor, the digital twin can be a representation by a computing device of a turbomachinery compressor including characteristics of the blades of the compressor. The computing device is in communication with sensors that monitor the turbomachinery compressor in real time and provide this data to the computing device in order to update and modify the digital twin to accurately represent the turbomachinery compressor. In this manner, the digital twin is utilized to calculate and predict corrosion based damage to the turbomachinery compressor.

The method utilized is based on predicting corrosion risk due to pitting in the compressor components without forced inspections. The methodology involves processing environmental data at the inlet of compressor and machine operating characteristics to model the salt-fouling or deposition phenomenon, moisture condensation, and/or evaporation during machine downtime and subsequent prediction of pit-size distributions as result of salt-water films on blades and vanes of compressors.

The salt deposition phenomena are modeled based on operational parameters such as air flow rate, total salt entering through the filter, filter efficiencies, and blade/vane geometric profiles. The moisture condensation is modeled as a water-film thickness transient for the offline/downtimes of the machine based on temperature, relative humidity, and/or average salt-loading density (e.g., in terms of mass per unit area).

Based on the calculated water-film thickness and concentration of salt in the water-film, a maximum pit-size probability is evaluated. The pit-size is then translated into corresponding high cycle fatigue debit based on a known experimental curve relating both of these parameters. The extent of high cycle fatigue debit is useful for making real-time operator decisions on blade inspection intervals.

Figure 1:
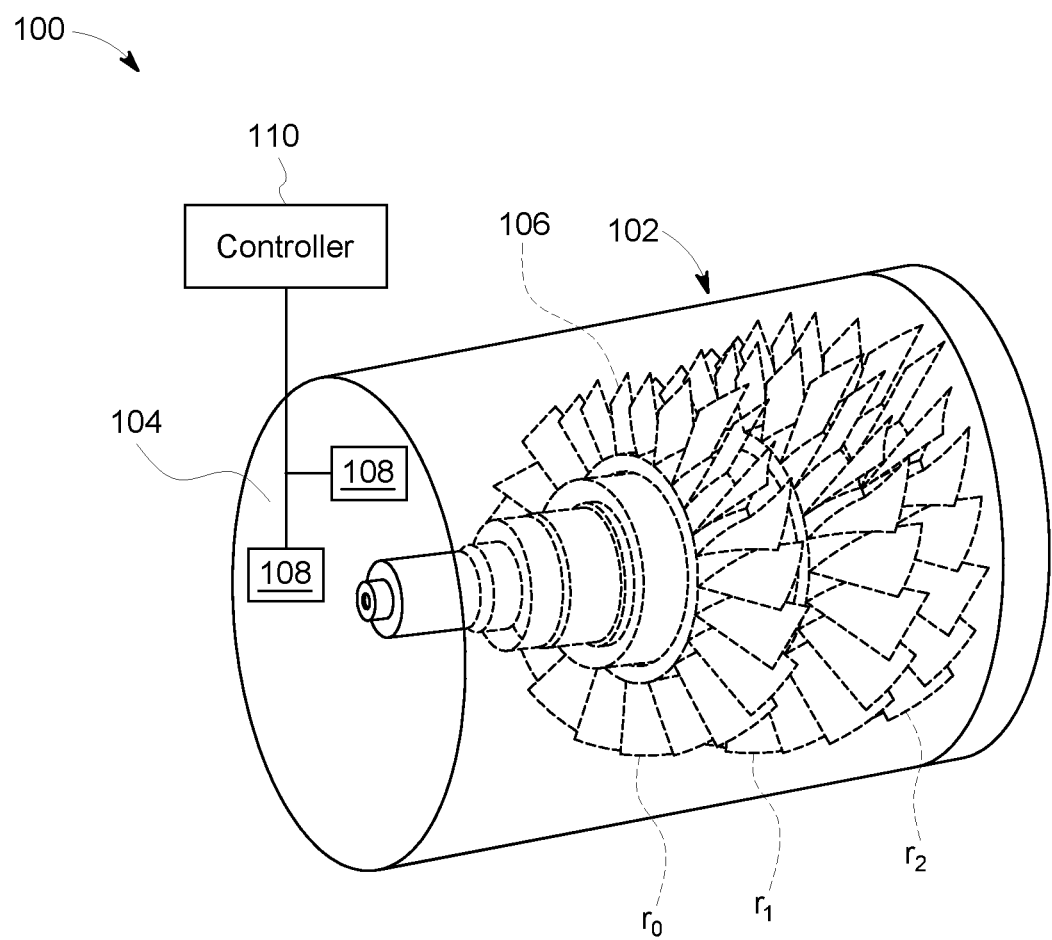
FIG. 1 is a schematic diagram of a control system for monitoring a turbomachinery compressor.

FIG. 1 is a schematic diagram showing features of one embodiment of a control system 100 for monitoring a turbomachinery compressor 102. The turbomachinery compressor 102 in one embodiment is a turbomachinery compressor utilized in a heavy-duty gas turbine or an aircraft engine, but optionally can be used in another system. The turbomachinery compressor 102 has an inlet 104 through which air is received and a plurality of rotating blades 106. The rotating blades 106 are in individual stages r0, r1, r2, rn, although more stages can be provided. A plurality of sensors 108 are placed in, around, and/or adjacent to the compressor 102, including but not limited to the inlet 104. The sensors 108 provide real-time data regarding the operation of the compressor 102, including but not limited to inlet temperature, % relative humidity, air flow rate, salt/chloride levels in air, waterwashes, time of wetness and the like. For example, the sensors 108 can obtain measurements of these characteristics during operation of the turbomachinery compressor 102. Such parameters and characteristics can be provided by sensors 108, historical data, calculated from sensed data, or the like. Each sensor is in communication with at least one controller 110 such that data is conveyed to the controller 110.

Figure 2:
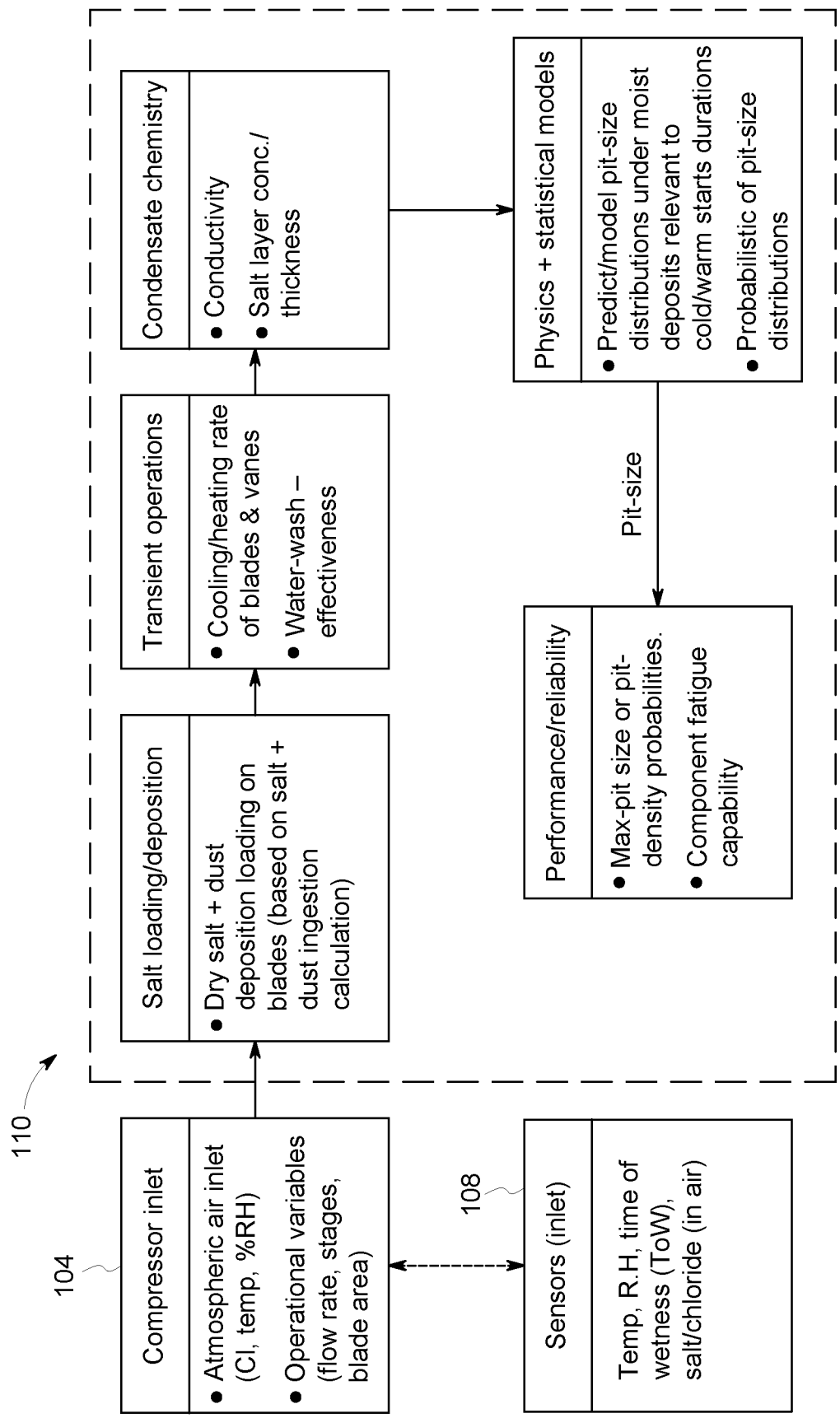
FIG. 2 illustrates a schematic diagram of a control system that provides a method of determining corrosion characteristics of a turbomachinery compressor.

FIG. 2 shows a schematic diagram of the controller 110 that receives information regarding the compressor 102, including the compressor inlet 104, such as atmospheric air inlet information including chloride or salt content, air temperature, % relative humidity and the like. Additional information about the compressor inlet 104 includes, but is not limited to, operational variables such as flow rate, the amount or number of stages r0, r1, r2, rn of the compressor, blade area, and the like. In particular, sensors 108 communicate information regarding the compressor inlet 104 such as inlet temperature, relative humidity, time of wetness (ToW, such as an amount of time that the compressor 102 is exposed to moisture), waterwashes, salt/chloride content in the air, and the like so that the controller can utilize the information with additional information inputted or provided to the controller, including historical data, in making calculations and creating a digital twin of the compressor so that the controller can determine a corrosion contaminant concentration of the compressor 102. The controller 110 represents hardware circuitry that includes and/or is connected with one or more processors (e.g., one or more microprocessors, field programmable gate arrays, and/or integrated circuits).

The analytic decision making and calculations that the controller 110 makes in analyzing the data communicated and provided to the controller 110 includes salt loading/deposition calculations, such as the amount of salt deposited onto the blades. Specifically, the dry salt and dust deposition loading on the blades is calculated based on a salt and dust ingestion calculation:

$$\text{Salt ingested} = \Sigma_{i=1}^{N} AFQ_i * SSSMass2.5_i$$

Where AFQ is the air mass flow rate and SSSMass2.5 is the salt concentration in the air having units of kilograms per cubic meter (in the sub—2.5-micron size). Data for this calculation is taken from an Onsite monitoring database (OSM), NASA GEOS or MERRA data from NASA's atmospheric database, and from waterwash information as provided in the graph of FIG. 3.

Figure 3:
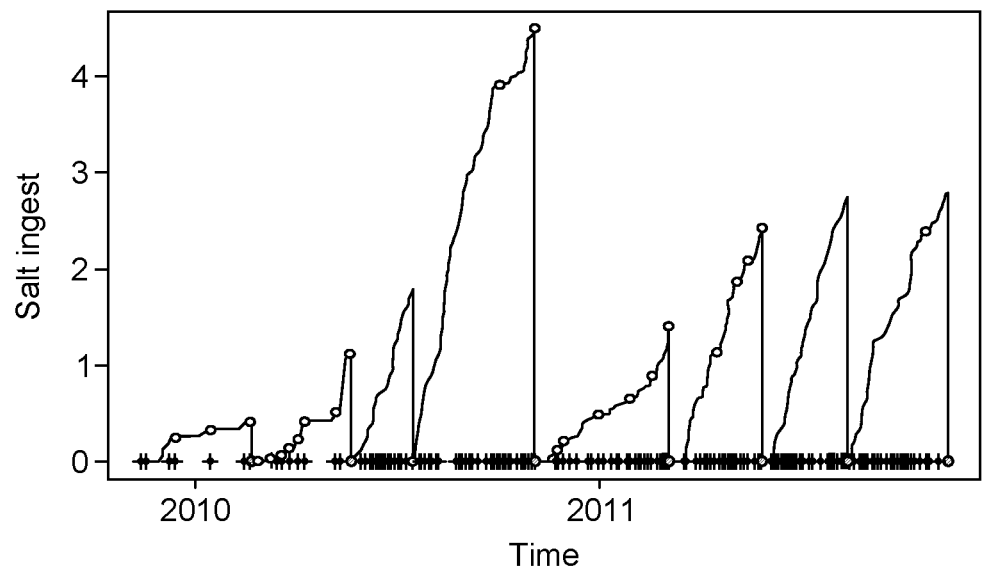
FIG. 3 illustrates a graph showing salt ingestion with the effect of water washes of a turbomachinery compressor over time.

For the compressor water washing events as shown in FIG. 3, the cumulative dust and salt ingested between two water wash events is computed. One assumption can be that if a water wash of the compressor occurs, then the dust and salt deposits get removed completely and so the salt ingestion resets to zero. Another alternative would be to reset the dust and salt ingested based on water wash parameters like water wash cycles, water wash duration and type of wash. The effect of air filter effectiveness would also be considered while computing the salt ingestion. As seen in FIG. 3, the dots greater than salt ingest of zero indicate down times greater than 20 hours, when the ambient temperature is greater than 50° F. and the relative humidity is greater than 75%. Meanwhile, the dots on the 0 axis of the salt ingest scale represent when an offline wash event has occurred during a machine downtime. The controller 110 than can utilize this data and information to make the salt and dust ingestion calculation in determining an upper limit (or maximum) on a calculated pit depth (e.g., $r_{max}$).

Figure 4:
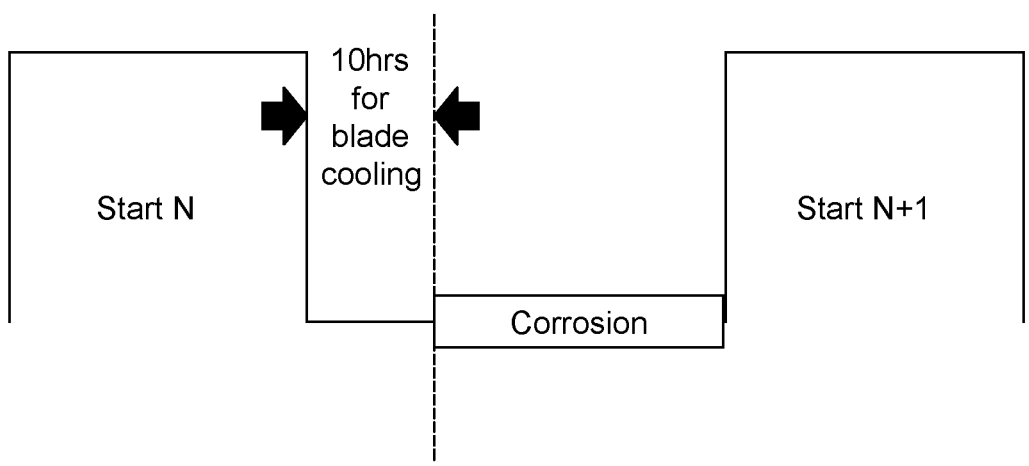
FIG. 4 illustrates a graph showing a machine startup-shutdown cycle with corrosion prone downtimes.

Another calculation the controller can make is to review transient operations of the compressor, including cooling or heating rate of blades and vanes of the compressor. As shown in FIG. 4, the aqueous corrosion periods would occur typically between two startup-shutdown cycles when the machine is in downtime. In operation, the blades operate at a temperature greater than ambient and enough heat is presented to prevent condensation. Once no longer in operation, the metal of the blades dissipates the heat and gradually, over time, the temperature of the blades returns to ambient temperature. Thus, when the blade temperature reaches ambient temperature and remains at ambient temperature, at optimal conditions of relative humidity and salt concentration a period of corrosion begins that can be measured. In the graph of FIG. 4, it takes approximately ten hours for the front stage blades to cool to ambient temperature and for the corrosion period to begin. This transient time would very well change based on the geometry of the component in question. Specifically, the blades are at a low enough temperature such that condensation can occur, thereby creating a salt water film that would result in a corrosive environment. Such corrosion is especially probable when additional predetermined corrosion parameters are presented such as an ambient temperature above 50° F. and the relative humidity is greater than 75%.

Once corrosion-prone downtimes are identified, the controller calculates salt loading. In one embodiment, salt loading is equal to the salt ingested (as previously calculated) times sticking probability over the total blade surface area. Alternatively, the sticking probability or coefficient is obtained from advanced computational fluid dynamics (CFD) and adhesion models either inputted into the controller or created by the controller for dust and/or salt deposition for the compressor.

Figure 5A:
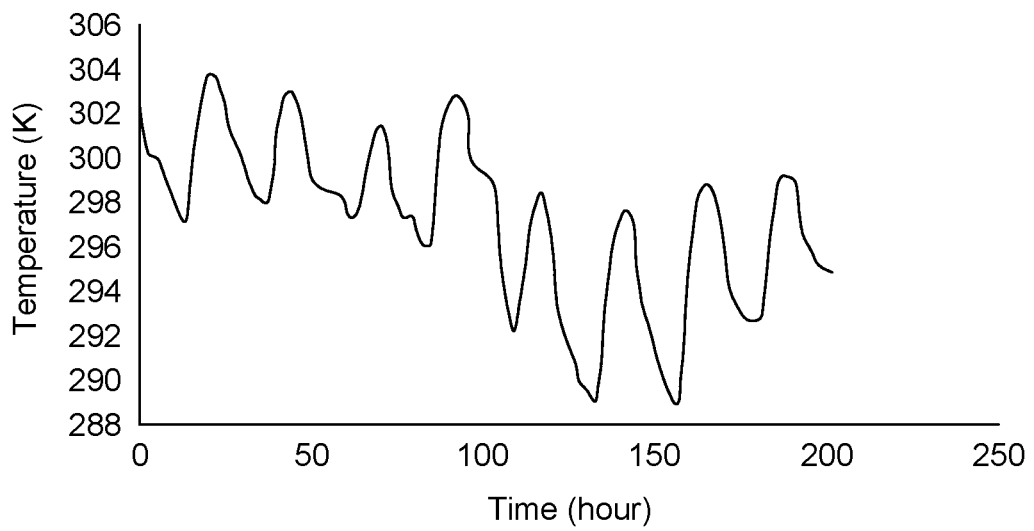
FIG. 5a illustrates a graph showing a component temperature over time.
Figure 5B:
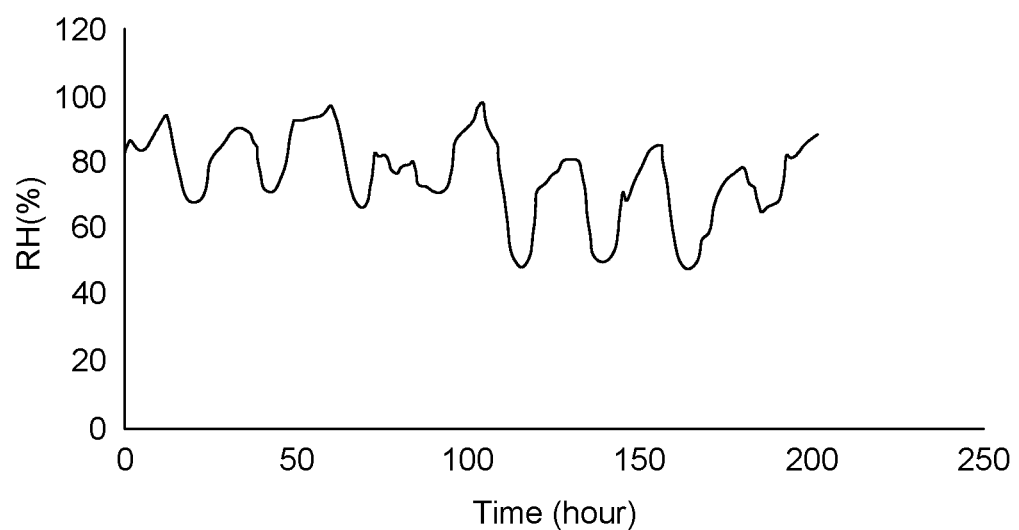
FIG. 5b illustrates a graph showing relative humidity over time.
Figure 5C:
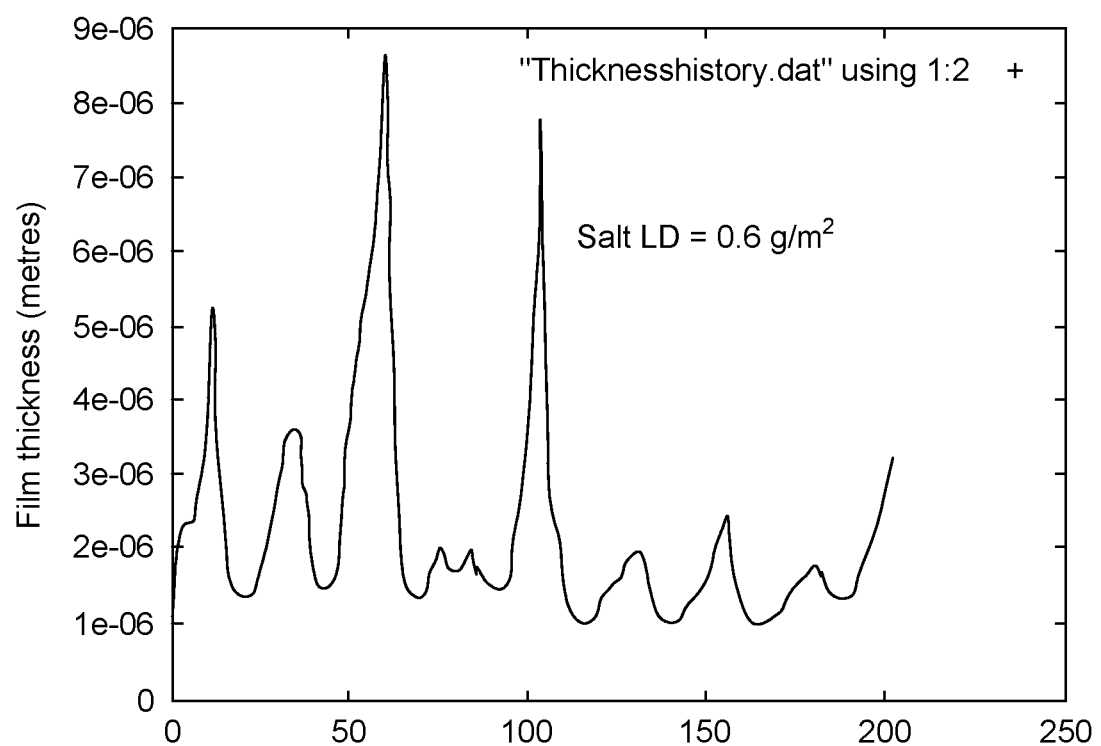
FIG. 5c illustrates a graph showing a component salt water film thickness over time.

Next, the controller makes condensate chemistry calculations including conductivity and salt layer thickness through condensation modeling. In particular, as shown in FIGS. 5a, 5b and 5c, temperature and relative humidity are used to calculate the salt water film thickness. Such calculation or combination of the temperature and relative humidity values can be done by any known method, including but not limited to as provided by N. Van den Steen et al., Electrochimica Acta 187 (2016) 714-723. Optionally, this calculation can be made where the mass flux of water towards or from the surface is approximated by:

$$m^* = km(w_\infty - w)$$

where $m^*$ represents the mass flux of water toward the surface of a blade, km is the mass transfer coefficient, w is the absolute saturated humidity at the film/air interface, and $w\infty$ is the absolute humidity of the air.

The absolute humidity of the air ($w\infty$) and the absolute saturated humidity (w) at the surface can be calculated as follows:

$$w_\infty = \frac{0.622 p_\infty^s RH_\infty}{p - p_\infty^s RH_\infty}$$

$$w = \frac{0.622 p^s}{p - p^s}$$

Equilibrium $RH = a_w * 100\%$ $$w = \frac{0.622 RH}{p - a_w p^s}$$

where p is the atmospheric pressure, $p^{S\infty}$ is the vapour pressure of the air, $p^S$ is the saturated vapour pressure, and $a_w$ is the activity of the water.

Figure 6:
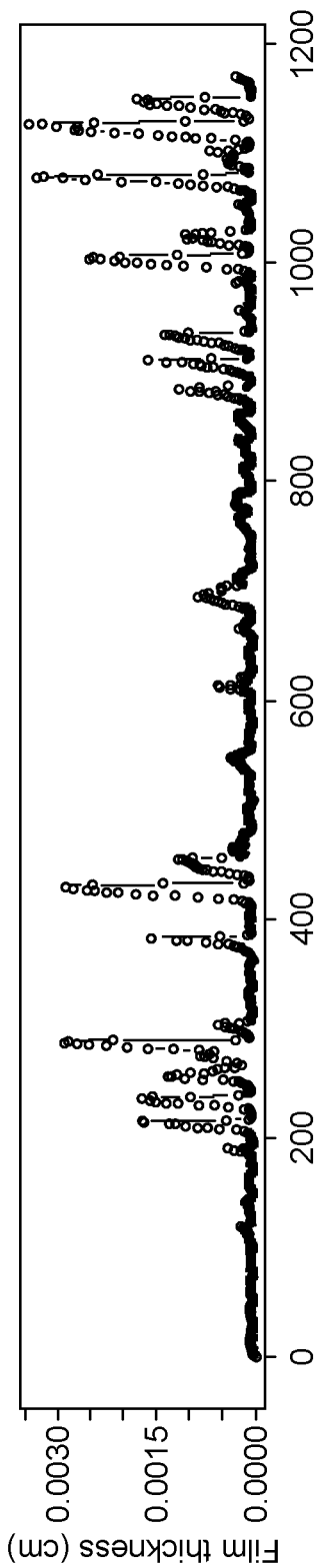
FIG. 6 illustrates a graph showing a component salt water film thickness over time.
Figure 7:
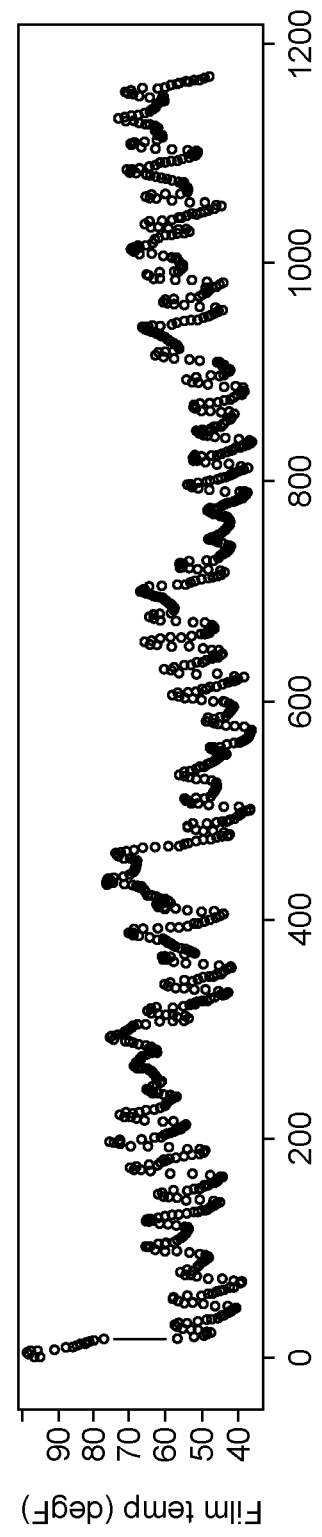
FIG. 7 illustrates a graph showing a component water film temperature over time.
Figure 8:
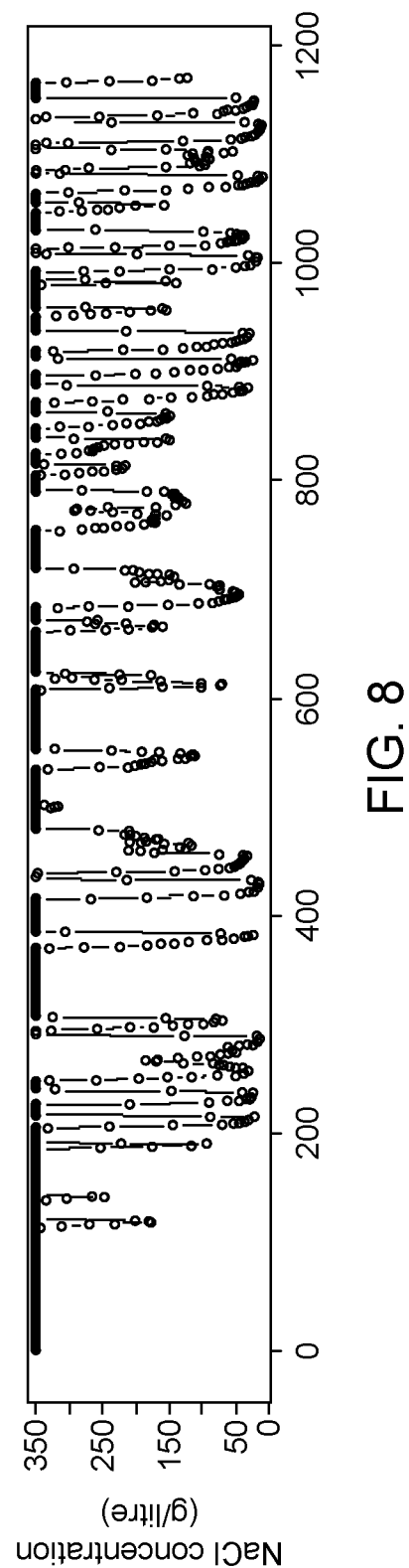
FIG. 8 illustrates a graph showing a component salt film concentration over time.

Meanwhile, the salt concentration is computed and modeled by the controller as shown in FIGS. 6-8. Specifically, salt concentration equals salt loading times specific density over film thickness. Thus, the film thickness, film temperature, and salt (e.g., NaCl) concentration are computed at each time instant.

The controller utilizes physics and statistical models to predict and determine pit-size distributions under moist deposits relevant to cold and warm starts and durations, and probabilistics of such pit-size distributions. An example of such a statistical model is seen in the Journal of The Electrochemical Society, 161 (8) E3216-E3224 (2014). Another example of a statistical model includes:

$$\frac{A'}{r_{max}} + \ln(r_{max}) = \ln(B') \text{ where}$$

$$A' = \frac{4\pi W L \Delta E_{max}}{C}, B' = \frac{C}{\left(\pi e \int_{Ecorr}^{Erp} i_c dE / \Delta E_{max}\right)}, \text{ and}$$

$C$ = Pit-stability product;

Where:

Area-Integral (in V·A/cm$^2$)=4.32*e−7−4.08e−08*T+ 9.782e−10*$T^2$ $\Delta E_{max}$(in mV)=$E_{corr}$−$E_{rp}$=640.4−47*T+$T^2$ Pit-Stability constant à C (A/cm)=0.012−0.0024*Cl+ 0.0054*T;

and where:
T is temperature of a metal surface in ° C.;
$E_{corr}$ is electrochemical corrosion potential;
$E_{rp}$ is repassivation potential as determined experimentally;
C is pit stability constant as obtained experimentally;
Cl is chloride concentration (no. of moles/litre);
WL is water layer thickness (cm);
κ is conductivity of the thin film salt-water layer (mho/cm);
e is euler's number (2.718);
ic is electrical current.

Figure 9:
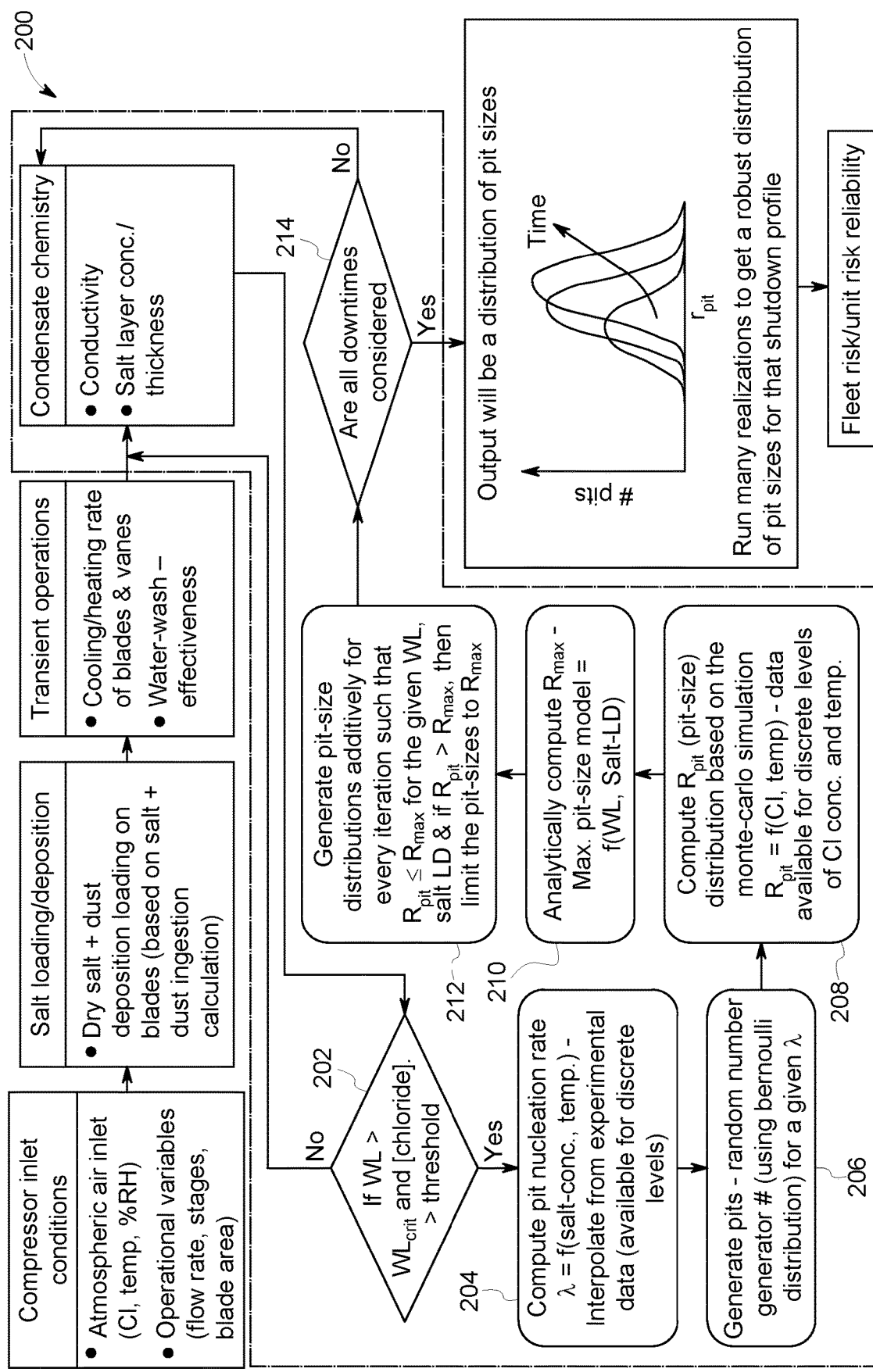
FIG. 9 illustrates a flow chart for making pit size probability calculations.

FIG. 9 shows the methodology for generating probabilistic pit distributions within the controller. At 202, the water layer thickness (WL) and chloride concentration values from the condensate chemistry calculations are compared against a critical water layer thickness and chloride concentration threshold. If the water layer thickness is greater than a critical water layer and chloride threshold, then at step 204 the controller computes pit nucleation rate where λ=function (Salt-conc., Temp.) which is an interpolation algorithm based on corrosion experimental data. At step 206, pits are generated assuming a probabilistic distribution for a given λ and, in one embodiment, a Bernoulli distribution is utilized.

At 208, Rpit distribution is generated using a Monte-Carlo simulation where:

Rpit=function(Cl,Temp)

where data is available for discrete levels of Cl concentration and temp.

At 210 the controller analytically computes max pit depth limit, Rmax utilizing a maximum pit size model where function(WL,Salt-LD)

and at 212 the controller generates pit-size distributions additively for every iteration where Rpit<Rmax for the given WL, Salt LD and if Rpit>Rmax then the pit-sizes are limited to Rmax.

At 214, a decision is made as to whether all downtimes have been considered by the controller. If not, condensate chemistry models and calculations continue for all identified machine downtime periods. If all downtimes have been considered, then a final distribution of pit sizes is generated for the end user.

Figure 10:
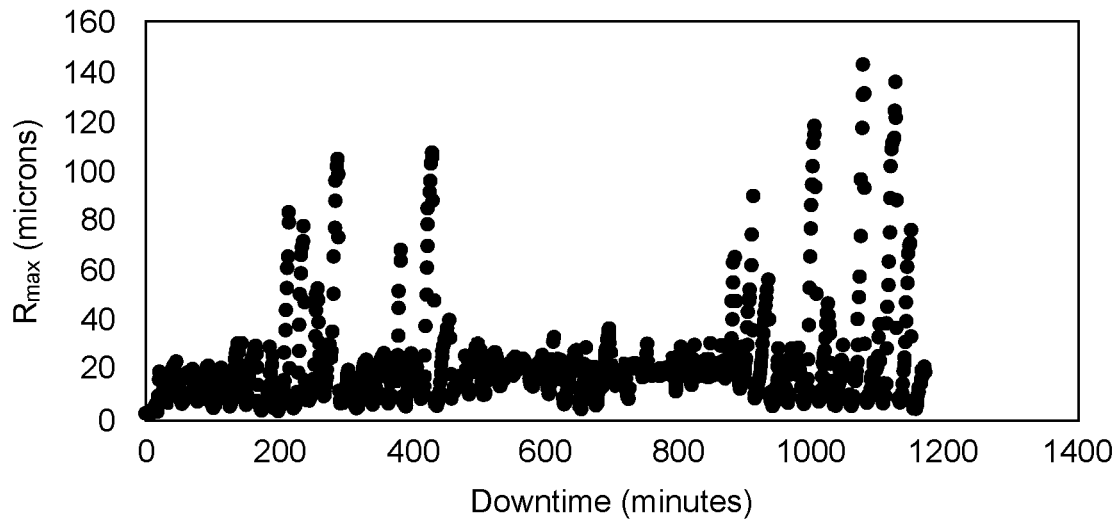
FIG. 10 illustrates a graph showing potential pit depth during corrosive downtimes.

The controller, by utilizing the physics and statistical models, is able to model performance reliability by calculating upper limits or maximums on the pit sizes and/or pit density probabilities in addition to debit to component fatigue capability. FIG. 10 shows the calculated pit depths at different time instants which is used to generate such a distribution. By calculating the upper limit or maximum pit size, the model is providing an upper bound of a worst-case scenario for the size of the radius of a given pit. A distribution can then be provided showing probabilities of different pit radius sizes such that the distribution model is used as a tool to determine both the most likely pit size and worst case pit size scenario. Thus, the model can be used to determine when a compressor should come in for maintenance and repair. Specifically, by making a transient pit calculation as shown in FIG. 10 that models the upper limit on pit radius distribution as a function of downtime, potential compressor servicing and use can be more closely monitored and predicted. The controller can even be configured to schedule maintenance, scheduled for a wash, or have a compressor removed from the field. In one embodiment, the controller communicates a control signal to a scheduling system for scheduling inspection or washing of the compressor and/or communicates a control signal to a robotic cleaning unit that automatically sprays water onto and/or into the compressor responsive to the upper limit on the pit radius distribution exceeding a designated threshold.

Figure 11:
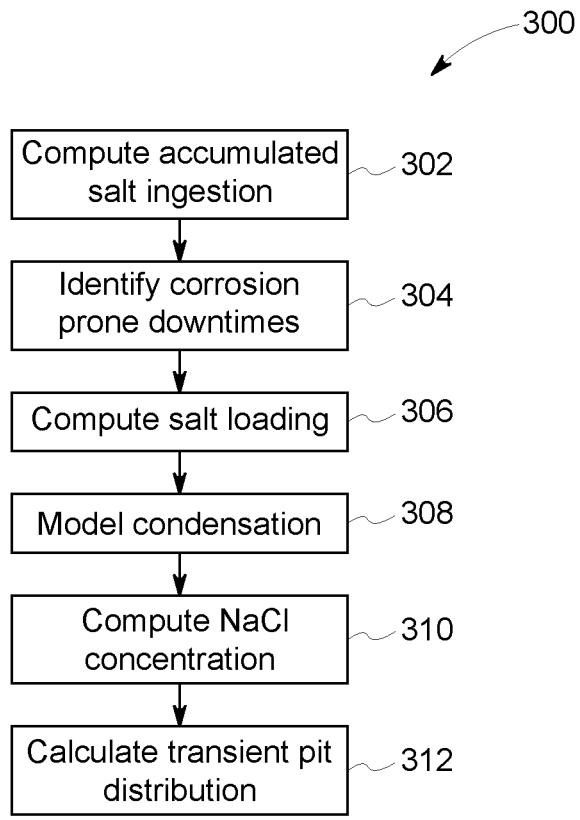
FIG. 11 illustrates a flow chart of a method for monitoring a turbomachinery compressor.

FIG. 11 shows a flow chart of the methodology 300 for calculating a transient pit depth Rmax utilizing the described control system. At 302, accumulated salt ingestion is computed using the data from sensors and inputted into the control system. At 304, corrosion-prone downtimes are identified based on the amount of time a compressor is at an ambient temperature. At 306, salt loading is computed based on salt ingested, sticking probability and total blade surface area. At 308, a water layer thickness and Chloride concentration based calculation is made to model condensation of the compressor. Next at 310, the chloride concentration is computed based on salt loading, specific density and film thickness. At 312, a transient pit distribution calculation is made based on physics and statistical modeling allowing predictions to be made about the compressor related to corrosion.

In one example, fleet performance data containing significant historical data from years of machine operation is inputted into the control system. This includes historical data related to the operating conditions of the compressor, relative humidity data, air temperature data, air salt concentration data, washing schedules and downtime data, including duration of downtime. Based on this information, the control system identifies corrosive time periods in which four predetermined conditions existed. These conditions were when the downtime was greater than twenty hours, the relative humidity was greater than 75%, the ambient temperature was greater than 50° F. and the salt concentration in the air was greater than 1 e-8 kg/m3. Then based on the amount of times these conditions occurred during a machine operating period the control system predicts the likelihood of a corrosion based event occurring, or a probability of detection. Based on the high likelihood of corrosion, the compressor is brought in for maintenance.

As yet another example, real-time data related to a compressor and compressor inlet is continually communicated to the control system from sensors, on-site computer and manually inputted as received. As a result, a controller creates a digital twin of the compressor and constantly models pit depth distributions. Once a predetermined amount of pits show a maximum radius above a threshold level of 100 microns, the compressor is scheduled for physical inspection.

As another example, historical data related to a compressor and compressor inlet again is communicated to the control system from sensors, on-site computer and manually inputted as received. The controller continually runs models based on the data received and described in this disclosure. When a water layer thickness becomes greater than a predetermined water layer thickness that is considered a critical water layer thickness, a pit nucleation rate is calculated and pits are generated. The controller then calculates maximum pit sizes and creates distributions. This evaluation is performed at all machine downtime periods. Once all downtimes are considered a final distribution of pit sizes is provided to be utilized for condition based maintenance of the compressor.

In yet another example, real-time data related to a compressor and compressor inlet conditions is continually communicated to the control system from sensors, on-site computer and manually inputted as received. As a result, a controller creates a digital twin of the compressor and constantly modeling pit depth distributions. The controller continually monitors for all times when the salt concentration is above a predetermined critical level or upper limit during downtime. Based on this, a pit size distribution model is provided and a time is scheduled by the controller so that a blade of the compressor can be subjected to maintenance/repair.

In one embodiment, a method is provided that includes determining, using one or more processors, contaminant loading of blades of a turbomachinery compressor based on one or more environmental conditions to which the turbomachinery compressor is exposed and one or more atmospheric air inlet conditions of the turbomachinery compressor. In this embodiment the method includes determining, using the one or more processors, a corrosion contaminant concentration on the blades of the turbomachinery compressor based on the contaminant loading that is determined. In this embodiment, the method also includes determining, using the one or more processors, one or more of an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

In one embodiment, the method further includes one or more of creating or updating a digital twin of the turbomachinery compressor based on the one or more of the upper limit on or the distribution of the potential corrosion of the blades of the turbomachinery, where the digital twin is configured to be monitored for determining when to repair one or more of the blades of the turbomachinery compressor. In another embodiment, the method also includes determining the one or more environmental conditions to which the turbomachinery compressor is exposed using one or more sensors.

In one embodiment, the one or more environmental conditions to which the turbomachinery compressor is exposed includes one or more of ambient temperature to which the turbomachinery compressor is exposed, relative humidity to which the turbomachinery compressor is exposed, a time period that the turbomachinery compressor is exposed to moisture, or a concentration of a salt to which the turbomachinery compressor is exposed. In another embodiment, the method also includes determining the one or more atmospheric air inlet conditions of the turbomachinery compressor using one or more sensors. In yet another embodiment, the one or more atmospheric air inlet conditions include one or more of a concentration of chloride in air that is received into the turbomachinery compressor, a temperature of the air that is received into the turbomachinery compressor, relative humidity of the air that is received into the turbomachinery compressor, a flow rate of the air that is received into the turbomachinery compressor, a stage of one or more of the blades of the turbomachinery compressor being examined, or an area of the one or more of the blades of the turbomachinery compressor being examined.

In one embodiment, the method provides determining one or more corrosion-prone time periods of the blades of the turbomachinery compressor based on the operational conditions of the turbomachinery compressor, where the one or more of the upper limit on or the distribution of the potential corrosion of the blades of the turbomachinery also is based on one or more of a duration or a frequency of the one or more corrosion-prone time periods. In this embodiment, determining the one or more corrosion-prone time periods includes identifying one or more time periods that are at least a designated temporal delay subsequent to cessation of operation of the turbomachinery compressor.

In one embodiment, determining the contaminant loading of the blades of the turbomachinery compressor also is based on an effectiveness of one or more washes of the blades of the turbomachinery compressor. In another embodiment, the contaminant loading of the blades of the turbomachinery compressor also is based on a mass flow rate of air into the turbomachinery compressor and a mass of a salt. In yet another embodiment, the contaminant loading of the blades of the turbomachinery compressor also is based on a probability that a salt sticks to the blades of the turbomachinery compressor and a surface area of one or more of the blades of the turbomachinery compressor. In this embodiment, the probability that salt and dust sticks to the blades of the compressor is determined using one or more computational fluid dynamics modelling and experimental testing. In another embodiment, the method also provides responsive to one or more of the upper limit on the potential corrosion exceeding a designated threshold or the distribution of the potential corrosion exceeding a designated distribution, one or more of automatically stopping operation of the turbomachinery compressor or automatically repairing one or more blades of the turbomachinery compressor.

In one embodiment, a control system is provided. The control system has one or more processors configured to determine contaminant loading of blades of a turbomachinery compressor based on one or more environmental conditions to which the turbomachinery compressor is exposed and one or more atmospheric air inlet conditions of the turbomachinery compressor. The one or more processors are also configured to determine a corrosion contaminant concentration on the blades of the turbomachinery compressor based on the contaminant loading that is determined. The one or more processors are also configured to determine one or more of an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

In one embodiment, the one or more processors are also configured to create or update a digital twin of the turbomachinery compressor based on the one or more of the upper limit on or the distribution of the potential corrosion of the blades of the turbomachinery, where the digital twin is configured to be monitored for determining when to repair one or more of the blades of the turbomachinery compressor. In another embodiment, the one or more processors are also configured to determine the one or more environmental conditions to which the turbomachinery compressor is exposed using one or more sensors. In yet another embodiment, the one or more atmospheric air inlet conditions include one or more of a concentration of chloride in air that is received into the turbomachinery compressor, a temperature of the air that is received into the turbomachinery compressor, relative humidity of the air that is received into the turbomachinery compressor, a flow rate of the air that is received into the turbomachinery compressor, a stage of one or more of the blades of the turbomachinery compressor being examined, or an area of the one or more of the blades of the turbomachinery compressor being examined.

In one embodiment, the one or more processors are also configured to determine one or more corrosion-prone time periods of the blades of the turbomachinery compressor based on the operational conditions of the turbomachinery compressor, where the one or more of the upper limit on or the distribution of the potential corrosion of the blades of the turbomachinery also is based on one or more of a duration or a frequency of the one or more corrosion-prone time periods. In another embodiment, the one or more processors are also configured to, responsive to one or more of the upper limit on the potential corrosion exceeding a designated threshold or the distribution of the potential corrosion exceeding a designated distribution, automatically stop operation of the turbomachinery compressor or automatically repair one or more blades of the turbomachinery compressor.

In one embodiment, a control system is provided having one or more processors configured to determine contaminant loading of blades of a turbomachinery compressor based on one or more environmental conditions to which the turbomachinery compressor is exposed and one or more atmospheric air inlet conditions of the turbomachinery compressor. The one or more processors are also configured to determine a corrosion contaminant concentration on the blades of the turbomachinery compressor based on the contaminant loading that is determined. The one or more processors are also configured to create or update a digital twin of the turbomachinery compressor, where the one or more processors are also configured to monitor the digital twin of the turbomachinery compressor to determine when to repair one or more of the blades of the turbomachinery compressor. In another embodiment, the one or more processors are also configured to, responsive to monitoring the digital twin, automatically stop operation of the turbomachinery compressor or automatically repair one or more blades of the turbomachinery compressor.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   determining, using one or more processors, contaminant loading of blades of a turbomachinery compressor based on one or more environmental conditions to which the turbomachinery compressor is exposed and one or more atmospheric air inlet conditions of the turbomachinery compressor;
   determining, using the one or more processors, a corrosion contaminant concentration on the blades of the turbomachinery compressor based on the contaminant loading that is determined; and
   determining, using the one or more processors, one or more of an upper limit on or a distribution of potential corrosion of the blades of the turbomachinery based on the corrosion contaminant concentration, at least one of the environmental conditions to which the turbomachinery compressor is exposed, and the corrosion contaminant concentration that is determined.

2. The method of claim 1, further comprising one or more of creating or updating a digital twin of the turbomachinery compressor based on the one or more of the upper limit on or the distribution of the potential corrosion of the blades of the turbomachinery, wherein the digital twin is configured to be monitored for determining when to repair one or more of the blades of the turbomachinery compressor.

3. The method of claim 2, wherein the potential corrosion of the blades of the turbomachinery is based on predicting corrosion risk due to pitting of the blades.

4. The method of claim 1, further comprising determining the one or more environmental conditions to which the turbomachinery compressor is exposed using one or more sensors.

5. The method of claim 1, wherein the one or more environmental conditions to which the turbomachinery compressor is exposed includes one or more of ambient temperature to which the turbomachinery compressor is exposed, relative humidity to which the turbomachinery compressor is exposed, a time period that the turbomachinery compressor is exposed to moisture, or a concentration of a salt to which the turbomachinery compressor is exposed.

6. The method of claim 1, further comprising determining the one or more atmospheric air inlet conditions of the turbomachinery compressor using one or more sensors.

7. The method of claim 1, wherein the one or more atmospheric air inlet conditions include one or more of a concentration of chloride salt, dust (organic and inorganic) in air that is received into the turbomachinery compressor, a stage of one or more of the blades of the turbomachinery compressor being examined, or an area of the one or more of the blades of the turbomachinery compressor being examined.

8. The method of claim 1, further comprising determining one or more corrosion-prone time periods of the blades of the turbomachinery compressor based on the operational conditions of the turbomachinery compressor, wherein the one or more of the upper limit on or the distribution of the potential corrosion of the blades of the turbomachinery also is based on one or more of a duration or a frequency of the one or more corrosion-prone time periods.

9. The method of claim 8, wherein determining the one or more corrosion-prone time periods includes identifying one or more time periods that are at least a designated temporal delay subsequent to cessation of operation of the turbomachinery compressor.

10. The method of claim 1, wherein determining the contaminant loading of the blades of the turbomachinery compressor also is based on an effectiveness of one or more washes of the blades of the turbomachinery compressor.

11. The method of claim 1, wherein the contaminant loading of the blades of the turbomachinery compressor also is based on a mass flow rate of air into the turbomachinery compressor and a mass of a salt.

12. The method of claim 1, wherein the contaminant loading of the blades of the turbomachinery compressor also is based on a probability that a salt sticks to the blades of the turbomachinery compressor and a surface area of one or more of the blades of the turbomachinery compressor.

13. The method of claim 12, wherein the probability that salt and dust sticks to the blades of the compressor is determined using one or more of computational fluid dynamics modelling and experimental testing.

14. The method of claim 1, further comprising, responsive to one or more of the upper limit on the potential corrosion exceeding a designated threshold or the distribution of the potential corrosion exceeding a designated distribution, one or more of automatically stopping operation of the turbomachinery compressor or recommending maintenance or repair of one or more blades of the turbomachinery compressor.

15. A control system comprising:
one or more processors configured to determine contaminant loading of blades of a turbomachinery compressor based on one or more environmental and machine operating conditions to which the turbomachinery compressor is exposed and one or more atmospheric air inlet conditions of the turbomachinery compressor;
the one or more processors also configured to determine a corrosion contaminant concentration on the blades of the turbomachinery compressor based on the contaminant loading that is determined; and
the one or more processors also configured to determine one or more of an upper limit on or a distribution of potential corrosion of the blades of the turbomachinery based on the corrosion contaminant loading, at least one of the environmental, operating and atmospheric air inlet conditions to which the turbomachinery compressor is exposed, and the corrosion contaminant concentration that is determined.

16. The control system of claim 15, wherein the one or more processors are also configured to create or update a digital twin of the turbomachinery compressor based on the one or more of the upper limit on or the distribution of the potential corrosion of the blades of the turbomachinery, wherein the digital twin is configured to be monitored for determining when to repair one or more of the blades of the turbomachinery compressor.

17. The control system of claim 15, wherein the one or more processors are also configured to determine the one or more environmental conditions to which the turbomachinery compressor is exposed using one or more sensors.

18. The control system of claim 15, wherein the one or more atmospheric air inlet conditions include one or more of a concentration of chloride salt, dust (organic and inorganic) in air that is received into the turbomachinery compressor, a temperature of the air that is received into the turbomachinery compressor, relative humidity of the air that is received into the turbomachinery compressor, a flow rate of the air that is received into the turbomachinery compressor, a stage of one or more of the blades of the turbomachinery compressor being examined, or an area of the one or more of the blades of the turbomachinery compressor being examined.

19. The control system of claim 15, wherein the one or more processors are also configured to determine one or more corrosion-prone time periods of the blades of the turbomachinery compressor based on the operational conditions of the turbomachinery compressor, wherein the one or more of the upper limit on or the distribution of the potential corrosion of the blades of the turbomachinery also is based on one or more of a duration or a frequency of the one or more corrosion-prone time periods.

20. The control system of claim 15, wherein the one or more processors are also configured to, responsive to one or more of the upper limit on the potential corrosion exceeding a designated threshold or the distribution of the potential corrosion exceeding a designated distribution, automatically stop operation of the turbomachinery compressor or recommending maintenance or repair one or more blades of the turbomachinery compressor.

21. A control system comprising:
one or more processors configured to determine contaminant loading of blades of a turbomachinery compressor based on one or more environmental conditions to which the turbomachinery compressor is exposed and one or more atmospheric air inlet conditions of the turbomachinery compressor;
the one or more processors also configured to determine a corrosion contaminant concentration on the blades of the turbomachinery compressor based on the contaminant loading that is determined; and
the one or more processors also configured to create or update a digital twin of the turbomachinery compressor, wherein the one or more processors are also configured to monitor the digital twin of the turbomachinery compressor to determine when to repair one or more of the blades of the turbomachinery compressor.

22. The control system of claim 21 wherein the one or more processors are also configured to, responsive to monitoring the digital twin, automatically stop operation of the turbomachinery compressor or automatically repair one or more blades of the turbomachinery compressor.

* * * * *